United States Patent
Zhang et al.

(10) Patent No.: US 11,755,888 B1
(45) Date of Patent: Sep. 12, 2023

(54) METHOD AND SYSTEM FOR ACCELERATING SCORE-BASED GENERATIVE MODELS WITH PRECONDITIONED DIFFUSION SAMPLING

(71) Applicant: Fudan University, Shanghai (CN)

(72) Inventors: Li Zhang, Shanghai (CN); Hengyuan Ma, Shanghai (CN); Xiatian Zhu, Shanghai (CN); Jianfeng Feng, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 18/151,923

(22) Filed: Jan. 9, 2023

(51) Int. Cl.
*G06N 3/0475* (2023.01)

(52) U.S. Cl.
CPC .................. *G06N 3/0475* (2023.01)

(58) Field of Classification Search
CPC ............ G06N 3/02; G06N 3/04; G06N 3/047; G06N 3/0475; G06N 20/00; G06N 20/10; G06N 20/20
See application file for complete search history.

(56) References Cited

U.S. PATENT DOCUMENTS

| | | | |
|---|---|---|---|
| 2019/0267019 A1* | 8/2019 | Ito | G06F 18/2134 |
| 2022/0100935 A1* | 3/2022 | Chen | G06N 3/084 |
| 2022/0392142 A1* | 12/2022 | Wolfe | G06T 5/20 |

OTHER PUBLICATIONS

Tero Karras et al.; A Style-Based Generator Architecture for Generative Adversarial Networks; CVPR; Computer Vision Foundation; pp. 4401-4410.

Chii-Ruey Hwang et al.; Accelerating Diffusions; The Annals of Applied Probability; 2005, vol. 15, No. 2, 1433-1444; DOI 10.1214/105051605000000025; Institute of Mathematical Statistics, 2005; pp. 1433-1444.

Fan Bao et al.; Analytic-DPM: an Analytic Estimate of the Optimal Reverse Variance in Diffusion Probabilistic Models; Iclr 2022; arXiv:2201.06503v3 [cs.LG] 3; pp. 1-39. May 2022.

Max Welling et al.; Bayesian Learning via Stochastic Gradient Langevin Dynamics; 28 th International Con-ference on Machine Learning, Bellevue, WA, USA, 2011; pp. 1-8.

Jonathan Ho et al.; Cascaded Diffusion Models for High Fidelity Image Generation; Journal of Machine Learning Research 23 (2022) 1-33; Submitted Jun. 2021; Revised Dec. 2021; Published Jan. 2022.

(Continued)

*Primary Examiner* — Shane D Woolwine
(74) *Attorney, Agent, or Firm* — Brad Bertoglio; Intelink Law Group, P.C.

(57) ABSTRACT

A method for accelerating score-based generative models (SGM) is provided, including setting a frequency mask (R) and a space mask (A) and a target sampling iteration number (T); sampling an initial sample ($x_0$); conducting iteration comprising steps as follows: sampling a noise term; applying a preconditioned diffusion sampling (PDS) operator (M) to the noise term and thus generate a preconditioned noise term; calculating a drift term; applying the transpose of the PDS operator ($M^T$) and then applying the PDS operator (M) to the drift term, and thus generate a preconditioned drift term; diffusing the sample of each iteration ($x_t$); and outputting the result.

19 Claims, 3 Drawing Sheets

(56) References Cited

OTHER PUBLICATIONS

Jascha Sohl-Dickstein et al.; Deep Unsupervised Learning using Nonequilibrium Thermodynamics; 32 nd International Conference on Machine Learning, Lille, France, 2015. JMLR: W&Cp vol. 37; pp. 1-10.
Jiaming Song et al.; Denoising Diffusion Implicit Models; Published as a conference paper at ICLR 2021; arXiv:2010.02502v4 [cs.LG] Oct. 5, 2022; pp. 1-22.
Jonathan Ho et al.; Denoising Diffusion Probabilistic Models; 34th Conference on Neural Information Processing Systems (NeurIPS 2020), Vancouver, Canada; pp. 1-12.
Prafulla Dhariwal et al.; Diffusion Models Beat GANs on Image Synthesis; 35th Conference on Neural Information Processing Systems (NeurIPS 2021); p. 15.
Valentin De Bortoli et al.; Diffusion Schrodinger Bridge with Applications to Score-Based Generative Modeling; 35th Conference on Neural Information Processing Systems (NeurIPS 2021); p. 15.
N. Ahmed et al.; Discrete Cosine Transfonn; IEEE Transactions On Computers, Jan. 1974; pp. 4.
Aapo Hyvarinen; Estimation of Non-Normalized Statistical Models by Score Matching; Journal of Machine Learning Research 6 (2005) 695{709 Submitted Nov. 2004; Revised Mar. 2005; Published Apr. 2005; p. 15.
Martin Heusel et al.; GANs Trained by a Two Time-Scale Update Rule Converge to a Local Nash Equilibrium; 31st Conference on Neural Information Processing Systems (NIPS 2017), Long Beach, CA, USA; p. 12.
Tan Goodfellow et al.; Generative Adversarial Networks; DOI:10.1145/3422622; Nov. 2020 ; vol. 63; No. 11; Communications of the ACM; pp. 139-144.
Yang Song et al.; Generative Modeling by Estimating Gradients of the Data Distribution; 33rd Conference on Neural Information Processing Systems (NeurIPS 2019), Vancouver, Canada; p. 13.
Alex Nichol et al.; Improved Denoising Diffusion Probabilistic Models; 38p. 10. th International Conference on Machine earning, PMLR 139, 2021.
Yang Song et al.; Improved Techniques for Training Score-Based Generative Models; 34th Conference on Neural Information Processing Systems (NeurIPS 2020), Vancouver, Canada; pp. 1-11.
Luc Rey-Bellet et al.; Irreversible Langevin Samplers and Variance Reduction: a Large Deviations Approach; London Mathematical Society; IOP Publishing; pp. 1-22.
G.O. Roberts et al.; Langevin Diffusions and Metropolis-Hastings Algorithms; Methodology and Computing in Applied Probability, 4, 337-357-, 2002; Khuwer Academic Publishers in The Netherlands.
Andrew Brock et al.; Large Scale Gan Training for High Fidelity Natural Image Synthesis; Published as a conference paper at ICLR 2019; arXiv:1809.11096v2 [cs.LG] Feb. 25, 2019; pp. 1-35.
Alex Krizhevsky; Learning Multiple Layers of Features from Tiny Images; Apr. 8, 2009; pp. 1-60.
Fisher Yu et al.; LSUN: Construction of a Large-Scale Image Dataset using Deep Learning with Humans in the Loop; arXiv: 1506.03365v3 [cs.CV] Jun. 4, 2016; p. 9.
M. Ottobre; Markov Chain Monte Carlo and Irreversibility; Department of Mathematics, Heriot-Watt University, Edinburgh EH14 4AS, Uk; p. 21.
Yang Song et al.; Maximum Likelihood Training of Score-Based Diffusion Models; 35th Conference on Neural Information Processing Systems (NeurIPS 2021); pp. 1-14.
Radford M. Neal; MCMC using Hamiltonian dynamics; arXiv:1206.1901v1 [stat.CO] Jun. 9, 2012; p. 51.
Gaurav Parmar et al.; On Aliased Resizing and Surprising Subtleties in GAN Evaluation; CVPR; Computer Vision Foundation; pp. 11410-11420.
T. Leli'evre et al.; Optimal non-reversible linear drift for the convergence to equilibrium of a diffusion; arXiv: 1212.0876v1 [math.NA] Dec. 4, 2012; pp. 1-48.
Tero Karras et al.; Progressive Growing of Gans for Improved Quality, Stability, and Variation; Published as a conference paper at ICLR 2018; arXiv:1710.10196v3 [cs.NE] Feb. 26, 2018; pp. 1-26.
Arash Vahdat et al.; Score-based Generative Modeling in Latent Space; 35th Conference on Neural Information Processing Systems (NeurIPS 2021); p. 16.
Yang Song et al.; Score-Based Generative Modeling Through Stochastic Equations; Published as a conference paper at ICLR 2021; arXiv:2011.13456v2 [cs.LG] Feb. 10, 2021; p. 36.
Zhisheng Xiao et al.; Tackling the Generative Learning Trilemma With Denoising Diffusion Gans; Published as a conference paper at ICLR 2022; arXiv:2112.07804v2 [cs.LG] 4; p. 28. Apr. 2022.
James W. Cooley et al.; The Fast Fourier Transform and Its Applications; IEEE Transactions On Education, vol. 12, No. 1, Mar. 1969; pp. 27-34.
Alex Nichol et al.; GLIDE: Towards Photorealistic Image Generation and Editing with Text-Guided Diffusion Models; arXiv:2112.10741v3 [cs.CV] Mar. 8, 2022; p. 20.

\* cited by examiner

METHOD AND SYSTEM FOR ACCELERATING SCORE-BASED GENERATIVE MODELS WITH PRECONDITIONED DIFFUSION SAMPLING

TECHNICAL FIELD

This invention is related to a method for accelerating score-based generative models (SGM), especially for accelerating score-based generative models with preconditioned diffusion sampling. This invention is also related to a system thereof.

BACKGROUND

As an alternative framework to generative adversarial networks (GANs), recent score-based generative models (SGM) have demonstrated excellent abilities in data synthesis (especially in high resolution images) with easier optimization, richer diversity, and more solid theoretic foundation. Starting from a sample initialized with a Gaussian distribution, a SGM produces a target sample by simulating a diffusion process, typically a Langevin dynamics.

Compared to the state-of-the-art GANs, a significant drawback with existing SGMs is drastically slower generation due to the need of taking many iterations for a sequential diffusion process. Formally, the discrete Langevin dynamic for sampling is typically formulated as $$x_t = x_{t-1} + \frac{\varepsilon_t^2}{2}\nabla_x \log p^*(x_{t-1}) + \varepsilon_t z_t,\ 1 \le t \le T \quad (1)$$

where $\varepsilon_t$ is the step size (a positive real scalar), $z_t$ is an independent standard Gaussian noise, and T is the iteration number. Starting from a standard Gaussian sample $x_0$, with a total of T steps this sequential sampling process gradually transforms $x_0$ to the sample $x_T$ that obeys the target distribution $p^*$. Often, T is at the scale of 1000s, and the entire sampling process is lengthy.

For accelerating the sampling process, a straightforward method is to reduce T by a factor and proportionally expand Et simultaneously, so that the number of calculating the gradient ∇x log p*(x), which consumes the major time, decreases whilst keeping the total update magnitude. However, this often makes pretrained SGMs fail in image synthesis. In general, two types of failure are observed: insufficient detailed structures, and dazzling with heavy noises. Conceptually, the sampling process as defined in Eq. (1) can be considered as a special case of Metropolis adjusted Langevin algorithm (MALA) at the Metropolis-Hastings rejection probability of 100%. When the coordinates of a target sample (e.g., the pixel locations of a natural image) are strongly correlated, the isotropic Gaussian noises {zt} would become inefficient for the variables x, caused by the ill-conditioned curvature of the sampling process (Girolami et al., "Riemann manifold langevin and hamiltonian monte carlo methods", Journal of the Royal Statistical Society: Series B (Statistical Methodology), 2011).

Sohl-Dickstein et al. ("Deep unsupervised learning using nonequilibrium thermodynamics", ICML, 2015) first proposed to destroy the data distribution through a diffusion process slowly and learned the backward process to recover the data, inspired by non-equilibrium statistical physics. Later on, Song and Ermon ("Generative modeling by estimating gradients of the data distribution", NeurIPS, 2019) further explored SGMs by introducing the noise conditional score network (NCSN). Song and Ermon ("Improved techniques for training score-based generative models", NeurIPS, 2020) further proposed NCSNv2 that scaled NCSN for higher resolution image generation (e.g., 256× 256) by scaling noises and improving stability with moving average. Song et al. ("Score-based generative modeling through stochastic diffferential equations", ICLR, 2021) summarized all the previous SGMs into a unified framework based on the stochastic differential equation (SDE) and proposed the NCSN++ model to generate high-resolution images via numerical SDE solvers for the first time. Bortoli et al. ("Diffffusion schrodinger bridge with applications to score-based generative modeling", NeurIPS, 2021) provided the first quantitative convergence results for SGMs. Vandat et al. ("Score-based generative modeling in latent space", NeurIPS, 2021) developed Latent Score-based Generative Model (LSGM) that trains SGMs in a latent space with the variational autoencoder framework. Another class of relevant generative models, mainly trained by reducing an evidence lower bound (ELBO) called denoising diffusion probabilistic models (DDPMs), also demonstrate excellent performance on image synthesis. Commonly, all of the above works use isotropic Gaussian distributions for the diffusion sampling.

Recently there are some works proposed on accelerating SGMs. Dockhorn et al. ("Score-based generative modeling with critically-damped langevin diffffusion", ICLR, 2022) improved the SGMs with Hamiltonian Monte Carlo methods ("Mcmc using hamiltonian dynamics. Handbook of markov chain monte carlo", 2011) and proposed critically-damped Langevin diffusion (CLD) based SGMs that achieves superior performance. Jolicoeur-Martineau et al. ("Gotta go fast when generating data with score-based models", arXiv preprint arXiv, 2021) utilized a numerical SDE solver with adaptive step sizes to accelerate SGMs.

However, these methods are limited in the following aspects:

(1) They tend to involve much extra computation. For example, CLD based SGMs expand the dimension of data by 2 times for learning the velocity of the diffusion. Jolicoeur-Martineau et al. added a high-order numerical solver that increases the number of calling the SGM, resulting in much more time. In comparison, with our PDS the only extra calculation relates the preconditioning matrix that can be efficiently implemented by Fast Fourier Transform.

(2) They are restricted to a single specific SGM.

(3) none of them has demonstrated a scalability to more challenging high-resolution image generation tasks (e.g., FFHQ facial images).

Hence, there is a need for a new and improved approach for accelerating score-based generative models.

BRIEF SUMMARY

To address the aforementioned challenges, in this invention it is proposed a novel and efficient, model-agnostic preconditioned diffusion sampling (PDS) method for accelerating existing pretrained SGMs without the need for model retraining. The key idea is that mathematically matrix preconditioning is effective in substituting a transformation variable in a way that the rates of curvature become more similar along all the directions, hence solving the ill-conditioned curvature problem.

Formally, it is to enrich the above Langevin dynamics (Eq. (1)) by imposing a preconditioning operation into the diffusion process as $$x_t = x_{t-1} + \frac{\varepsilon_t^2}{2} MM^T \nabla_x \log p^*(x_{t-1}) + \varepsilon_t M z_t,\ 1 \le t \le T \quad (2)$$

where M is the newly introduced preconditioning matrix designed particularly for regulating the behavior of accelerated diffusion processes. Concretely, this proposed reformulation equips the diffusion process with a novel ability to enhance or restrain the generation of detailed structures via controlling the different frequency components of the noises (Bovik, "The Essential Guide to Image Processing", 2009). This can be realized in the single formulation (Eq. (2)) with the M matrix designed flexibly to tackle both failure cases.

Specifically, in one aspect of this invention, it is proposed a method for accelerating score-based generative models (SGM), including 1) setting a frequency mask (R) and a space mask (A) for a given dataset, wherein the frequency mask (R) and a space mask (A) both have a same shape as the data point in the dataset;

2) setting a target sampling iteration number (T);

3) sampling an initial sample ($x_0$) which is a random Gaussian vector, having a same shape as the data point in the dataset;

4) conducting iteration, for each iteration number (t) from 1 to the target sampling iteration number (T), conducting the steps as follows:

4.1) sampling a noise term which has the same shape as the initial sample;

4.2) applying a preconditioned diffusion sampling (PDS) operator (M) to the noise term and thus generate a preconditioned noise term, wherein the PDS operator is constructed as follows:

(a) using Fast Fourier Transform (FFT) to map an input vector in a space domain into the frequency domain and thus generate a first mapped vector;

(b) adjusting the first mapped vector using the frequency mask (R), wherein the frequency mask (R) regulates the frequency coordinates of the input vector and is in element-wise multiplication with the first mapped vector;

(c) mapping the adjusted first mapped vector back to the space domain by the inverse of Fast Fourier Transform and thus generate a second mapped vector;

(d) using the space mask (A) to regulate the pixel coordinates of the input vector, wherein the space mask is in element-wise multiplication with the second mapped vector;

wherein the elements of the frequency mask (R) are all positive;

4.3) calculating a drift term by a update function which has three input parameters including the sample of the previous iteration ($x_{t-1}$), the present iteration number, the present step size;

4.4) applying the transpose of the PDS operator ($M^T$) and then applying the PDS operator (M) to the drift term, and thus generate a preconditioned drift term;

4.5) calculating the summation of the preconditioned drift term and a scale term, and then taking the real part of the summation for the diffusion of the sample of present iteration ($x_t$); wherein the scale term controls the scale of the noise term;

5) outputting the sample of the final iteration ($x_T$), which obeys the distribution of the dataset.

Preferably, after step 4.4), further calculating a solendial term of the present iteration ($S_t$) constructed by a score function transformed by a skew-symmetric linear operator, wherein the score function is fitted by the SGM network, and adding the solendial term into the summation of step 4.5).

Preferably, the type of data point includes audio, image and video.

In another aspect of this invention, it is proposed a method for constructing a preconditioning operator to accelerate the sampling phase of a score-based generative models (SGM), including, (a) using Fast Fourier Transform (FFT) to map an input vector in a space domain into the frequency domain and thus generate a first mapped vector;

(b) adjusting the first mapped vector by using a frequency mask (R) having the same shape as the input vector, to regulate the frequency coordinates of the input vector, wherein the frequency mask (R) is in element-wise multiplication with the first mapped vector;

(c) mapping the adjusted first mapped vector back to the space domain by the inverse of Fast Fourier Transform and thus generate a second mapped vector;

(d) using a space mask (A) having the same shape as the input vector to regulate the pixel coordinates of the input vector, wherein the space mask is in element-wise multiplication with the second mapped vector;

wherein the elements of the frequency mask (R) are all positive;

Preferably, using FFT includes adopting 2D FFT when the input vector is an image.

Preferably, adopting 2D FFT includes implementing 1D FFT column-wise and row-wise successively.

Preferably, the frequency mask is calculated by utilizing the statistics of the dataset.

Alternatively, the frequency mask is constructed by the formula $$R(c, h, w) = \begin{cases} 1, & \text{if} (h - 0.5H)^2 + (w - 0.5W)^2 \leq 2r^2 \\ \lambda, & \text{otherwise} \end{cases}$$

where $1 \leq c \leq C, 1 \leq h \leq H$ and $1 \leq w \leq W$, while C is the channel number, H is the height, and W is the width of the image; and wherein the parameter $\lambda > 0$ specifies the ratio for shrinking or amplifying the coordinates located out of the circle $\{(h-0.5H)^2 + (w-0.5W)^2 \leq 2r^2\}$, and r is the radial range of the filter.

In yet another aspect of this invention, it is proposed a system for accelerating score-based generative models (SGM), including a processor, which is adapted for running computer program to implement computer instructions as follows:

1) setting a frequency mask (R) and a space mask (A) for a given dataset, wherein the frequency mask (R) and a space mask (A) both have a same shape as the data point in the dataset;

2) setting a target sampling iteration number (T);

3) sampling an initial sample ($x_0$) which is a random Gaussian vector, having a same shape as the data point in the dataset;

4) conducting iteration, for each iteration number (t) from 1 to the target sampling iteration number (T), conducting the steps as follows:

4.1) sampling a noise term which has the same shape as the initial sample;

4.2) applying a preconditioned diffusion sampling (PDS) operator (M) to the noise term and thus generate a preconditioned noise term, wherein the PDS operator is constructed as follows:

(a) using Fast Fourier Transform (FFT) to map an input vector in a space domain into the frequency domain and thus generate a first mapped vector;

(b) adjusting the first mapped vector using the frequency mask (R), wherein the frequency mask (R) regulates the frequency coordinates of the input vector and is in element-wise multiplication with the first mapped vector;

(c) mapping the adjusted first mapped vector back to the space domain by the inverse of Fast Fourier Transform and thus generate a second mapped vector;

(d) using the space mask (A) to regulate the pixel coordinates of the input vector, wherein the space mask is in element-wise multiplication with the second mapped vector;

wherein the elements of the frequency mask (R) are all positive;

4.3) calculating a drift term by a update function which has three input parameters including the sample of the previous iteration ($x_{t-1}$), the present iteration number, the present step size;

4.4) applying the transpose of the PDS operator ($M^T$) and then applying the PDS operator (M) to the drift term, and thus generate a preconditioned drift term;

4.5) calculating the summation of the preconditioned drift term and a scale term, and then taking the real part of the summation for the diffusion of the sample of present iteration ($x_t$); wherein the scale term controls the scale of the noise term;

5) outputting the sample of the final iteration ($x_T$), which obeys the distribution of the dataset.

Generally speaking, the approach of the PDS of this invention can preserve the original SGM's target distribution. Further, any structured priors available with a target distribution can be also accommodated, e.g., the average spatial structures of human faces. The computational cost of calculating M is marginal when using Fast Fourier Transform (FFT). In this application, there are advantages as follows:

(1) a novel preconditioned diffusion sampling (PDS) process is introduced for sampling acceleration, which reformulates the existing diffusion process with a preconditioning operation additionally imposed for adaptively regulating the frequency components' amount in the noises, whilst keeping the original target distributions in convergence.

(2) a variety of pre-trained SGMs can be accelerated significantly with PDS for image synthesis of various spatial resolutions, without model retraining. In particular, PDS delivers about 29× reduction in wall-clock time for high-resolution image synthesis.

BRIEF DESCRIPTION OF DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

Wherein.

DETAILED DESCRIPTION

Figure 1:
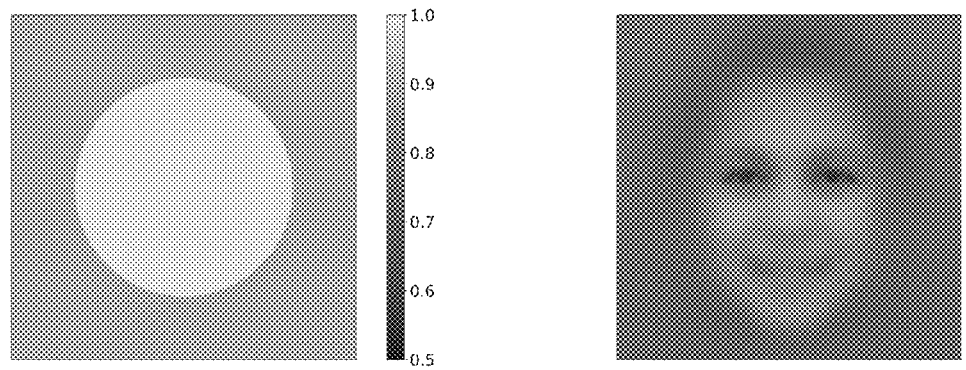
FIG. 1 illustratively shows image examples of frequency preconditioning R and mean of FFHQ dataset used for constructing space preconditioning A used in proposed preconditioning operator M, according to one embodiment of this invention.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

Score matching is developed for non-normalized statistical learning. Given independent and identically distributed samples of an unknown distribution p*, score matching allows the model to directly approximate the score function $\nabla_x \log p^*(x)$. SGMs aim to generate samples from p* via score matching by simulating a Langevin dynamics initialized by Gaussian noise $$dx = \frac{g^2(t)}{2} \nabla_x \log p^*(x) dt + g(t) dw \qquad (3)$$

where g:R+→R+ controls the step size and dw represents a Wiener process. With this process, in this application it is to transform a sample drawn from an initial Gaussian distribution to approach the desired distribution p*. A classical SGM, noise conditional score network (NCSN), is trained by learning how to reverse a process of gradually corrupting the samples from p*, and aims to match the score function. After training, NCSN starts from a Gaussian distribution and travels to the target distribution p* by simulating an annealed Langevin dynamics.

Song and Ermon presented NCSNv2 that improves the original NCSN by designing better noise scales, iteration number, and step size. This new variant is also more stable by using the moving average technique. Song et al. further proposed NCSN++ that utilizes an existing numerical solver of stochastic differential equations to enhance both the speed of convergence and the stability of the sampling method. Importantly, NCSN++ can synthesize high-resolution images at high quality.

Although SGMs have been able to generate images comparable to GANs, they are much slower due to the sequential computation during the sampling phase. For example, to produce 8 facial images at 1024×1024 resolution, a SGM spends more than 30 mins. To maximize the potential of SGMs, it is critical to solve this slow inference bottleneck.

In this application it aims to solve the slow inference problem with SGMs. For easier understanding, let us start from the most classical Langevin dynamics.

Steady-State Distribution Analysis

Here is the classical Langevin dynamics $$dx = \frac{\epsilon^2}{2} \nabla_x \log p^*(x) dt + \epsilon dw \quad (4)$$

where p* is the target distribution, and ε>0 is the fixed step size. It is associated with a Fokker-Planck equation $$\frac{\partial p}{\partial t} = -\frac{\epsilon^2}{2} \nabla_x \cdot (\nabla_x \log p^*(x) p) + \frac{\epsilon^2}{2} \Delta_x p \quad (5)$$

where p=p(x,t) describes the distribution of x that evolves over time. The steady-state solution of Eq. (5) corresponds to the probabilistic density function of the steady-state distribution of Eq. (4), i.e., p*

$$\nabla_x \cdot (\nabla_x \log p^*(x) p) = \Delta_x p \quad (6)$$

The Fokker-Planck equation tells how to preserve the steady-state distribution of the original process when we alter Eq. (4) for specific motivations. Concretely, we can impose an invertible linear operator M to the noise term dw and conduct the associated operation on the gradient term so that the steady-state distribution can be preserved. This design is formulated as:

$$dx = \frac{\epsilon^2}{2}(MM^T + S)\nabla_x \log p^*(x) dt + \epsilon M dw \quad (7)$$

where S is a skew-symmetric linear operator.

The steady-state distribution of Eq. (4) and Eq. (7) are the same, as long as the linear operator M is invertible and the linear operator S is skew-symmetric.

The Fokker-Planck equation of Eq. (7) is $$\frac{\partial p}{\partial t} = -\frac{\epsilon^2}{2} \nabla_x \cdot (MM^T \nabla_x \log p^*(x) p) - \quad (8)$$
$$\frac{\epsilon^2}{2} \nabla_x \cdot (S \nabla_x \log p^*(x) p) + \frac{\epsilon^2}{2} \nabla_x \cdot (MM^T \nabla_x p)$$

The corresponding steady-state equation is $$\nabla_x \cdot (MM^T \nabla_x \log p^*(x) p) + \nabla_x \cdot (S \nabla_x \log p^*(x) p) = \nabla_x \cdot (MM^T \nabla_x p) \quad (9)$$

Set p=p*, the above equation becomes $$\nabla_x \cdot (MM^T \nabla_x \log p^*(x) p^*) + \nabla_x \cdot (S \nabla_x \log p^*(x) p^*) = \nabla_x \cdot (MM^T \nabla_x p^*) \quad (10)$$

The first term in the L.H.S. equals to the R.H.S., since $$\nabla_x \cdot \left( MM^T \nabla_x \log p^* \frac{1}{p^*} p^* \right) = \nabla_x \cdot (MM^T \nabla_x p^*) \quad (11)$$

Additionally, the second term in the L.H.S. equals to zero, since S is skew-symmetric. Then, the steady-state solution of Eq. (6) also satisfies the steady-state equation of Eq. (7).

The above results can be extended to a more general case as follows.

Consider the diffusion process $$dx = \frac{1}{2} G(t) G(t)^T \nabla_x \log p^*(x) dt + G(t) dw \quad (12)$$

where G:R→Rd×d. M is an invertible d×d matrix and S is a skew-symmetric d×d matrix. Denote p* as the steady-state distribution of Eq. (12), then the process $$dx = \frac{1}{2} MM^T G(t) G(t)^T \nabla_x \log p^*(x) dt + S \nabla_x \log p^*(x) dt + MG(t) dw \quad (13)$$

has the same steady-state distribution as that of Eq. (12).

The steady-state distribution of Eq. (12) satisfies $$\nabla_x \cdot (G(t) G(t)^T \nabla_x \log p^*(x) p) = \nabla_x \cdot (G(t) G(t)^T \nabla_x p) \quad (14)$$

and the steady-state distribution of Eq. (13) satisfies $$\nabla_x \cdot (MM^T G(t) G(t)^T \nabla_x \log p^*(x) p) + \nabla_x \cdot (S \nabla_x \log p^*(x) p) = \quad (15, 16)$$
$$\nabla_x \cdot (MM^T G(t) G(t)^T \nabla_x p)$$

Using the skew-symmetry of S, it is easy to find that p* satisfies both Eq. (12) and Eq. (13).

The conditions of this theorem are all satisfied for the diffusion process used in NCSN, NCSNv2, and NCSN++.

It is to design a preconditioning matrix as Eq. (7) while keeping the steady-state distribution simultaneously. This is also because, preconditioning has been proved to be able to significantly accelerate the stochastic gradient descent algorithm (SGD) and Metropolis adjusted Langevin algorithms (MALA). Besides, SGD provides another view for interpreting our method, that is, SGMs sequentially reduce the energy (−log p*(x)) of a sample x via stochastic gradient descent, with the randomness coming from the Gaussian noises added at every single step.

Preconditioned Diffusion Sampling

This part is about how to construct the preconditioning operator M to accelerate the sampling phase of SGMs, with S=0 for Eq. (7). It is observed that when reducing the iteration number for the sampling process of a SGM and expand the step size proportionally for a consistent accumulative update, the images generated tend to miss necessary detailed structures, or involve high-frequency noises. To solve these failure, it is to leverage a preconditioning operator M serving as a filter to regulate the frequency distribution of the samples.

1. Given an input vector x, it is first used Fast Fourier Transform (FFT) to map it into the frequency domain x^=F[x]. For images, it is to adopt the 2D FFT that implements 1D FFT column-wise and row-wise successively.

2. Then it is to adjust the frequency signal using a mask R in the same shape as x: R⊙x^, where ⊙ means element-wise multiplication. The elements of R are all positive.

3. Lastly, it is to map the vector back to the original space by the inverse of Fast Fourier Transform: F−1[R⊙x^].

For specific tasks (e.g., human facial image generation), most samples might share a consistent structural characteristics. This prior knowledge however is unavailable with the noises added to each step in the diffusion process. To solve this problem, it is further proposed a space mask A for space preconditioning, constructed by statistical average of random samples. This can be used to regulate the noise via element-wise multiplication as: A ⊙[·], which works as a space structure filter. Combining the both operations above, we define a preconditioning operator M as $$M[\cdot]=A\odot F^{-1}[R\odot F[\cdot]] \qquad (17)$$

To guarantee the invertibility of M, the elements of R are set strictly positive. For the tasks without clear space structure priors, it is simply not to apply the space preconditioning by setting all the elements of A to 1. It is to operate M on the noise term dw and adjust the gradient term to keep the steady-state distribution as shown in Eq. (7).

Interestingly, it is found that the proposed method above is likely to even cause further model degradation. This is because, if to implement a variable transformation as y=M−1x, Eq. (7) can be rewritten as $$dy = \frac{\varepsilon^2}{2}\nabla_y \log p^*(y)dt + \varepsilon dw \qquad (18)$$

which returns to the same format as the original process. The diffusion process is made worse since, M−1, the inverse of M, could impose the exactly opposite effect of M. To overcome this challenge, it is to further substitute M with M−1 in Eq. (7) in order to take the positive effect of M as $$dx = \frac{\varepsilon^2}{2}M^{-1}M^{-T}\nabla_x \log p^*(x)dt + \varepsilon M^{-1}dw \qquad (19)$$

Since in this case, we can rewrite Eq. (19) in the same format as the original process, after applying the variable transformation y=Mx.

For completeness, it is to further briefly discuss the possibility to construct preconditioning matrix using the matrix S (Eq. (7)) as an accelerator of the diffusion process.

The term $S\nabla_x \log p^*(x)dt$ drives a solenoidal flow that makes the system converge faster to the steady state. Under the regularity conditions, |x(t)| usually does not reach the infinity in a finite time, and the convergence of an autonomous (the right side of the equation does not contain time explicitly) diffusion process $$dx = \frac{\varepsilon^2}{2}\nabla_x \log p^*(x)dt + \varepsilon dw \qquad (20)$$

can be accelerated by introducing a vector field C(x) ∈Rd→Rd $$dx = \frac{\varepsilon^2}{2}\nabla_x \log p^*(x)dt + C(x)dt + \varepsilon dw \qquad (21)$$

where C(x) should satisfy $$\nabla_x \cdot \left(\frac{c(x)}{p^*(x)}\right) = 0 \qquad (22)$$

It is easy to show that $C(x)=S\nabla_x \log p^*(x)$ satisfies the above condition. However, the diffusion process of existing SGMs is typically not autonomous, due to the step size ε varies across time designed to guarantee numerical stability. Despite this, it is still worth investigating the effect of S for the sampling process for completeness (see evaluation infra.). As such, preconditioning matrix is expanded from the invertible symmetric matrix in form of $MM^T$, to more general cases where preconditioning matrices can be written as $MM^T+S$.

Instantiation of Preconditioned Diffusion Sampling

The preconditioned diffusion sampling (PDS) method for accelerating the diffusion sampling process of this application is summarized in Alg. 1.

---

Algorithm 1 Preconditioned diffusion sampling

---

Input: The frequency R and space A preconditioning operators, the target sampling iterations T;
Diffusion process:
Drawing an initial sample $x_0 \sim N(0, I_{C\times H\times W})$
for t = 1 to T do
    Drawing a noise $w_t \sim N(0, I_{C\times H\times W})$
    Applying PDS: $\eta_t \leftarrow F^{-1}[F[w_t \bullet A] \bullet R]$    ▷ • means element-wise division
    Calculating the drift term $d_t \leftarrow h(x_{t-1}, t, \epsilon_t)$
    Applying PDS: $d_t \leftarrow F^{-1}[F[F^{-1}[F[d_t] \bullet R] \bullet A^2] \bullet R]$
    Calculating the solenoidal term $S_t \leftarrow S \nabla_x \log p^*(x_{t-1})$
    Diffusion $x_t \leftarrow Re[d_t + S_t + \phi(t)\eta_t]$    ▷ Re[·] means taking the real part
end for
Output: $x_T$ For generality, the original diffusion process is written as $$x_t = h(x_{t-1}, t) + \phi(t)z_t \quad (23)$$

where $h(x_{t-1},t)$ represents the drift term and $\varphi(t)$ the function controlling the scale of the noise $z_t$.

It is to take the real part whilst dropping the imaginary part generated every step as it can not be utilized by the SGMs. Now it is to construct the space and frequency preconditioning filter. Given a target dataset image with distribution p*, its space preconditioning filter A is calculated as $$A(c, w, h) = \log(\mathbb{E}_{x \sim p^*(x)}[x(c, w, h)] + 1) \quad (24)$$

where $1 \leq c \leq C$, $1 \leq w \leq W$, $1 \leq h \leq H$ are the channel, width and height dimensions of image. In practice, we also normalize A for a stability $$A(c, w, h) = \frac{A(c, w, h)}{\max A(c, w, h)} \quad (25)$$

There are two approaches for calculating the filter R. The first approach is to utilize the statistics of the dataset. Specifically, we first define the frequency statistics given a specific image dataset that we are aimed to synthesize as $$R(c, w, h) = \log(\mathbb{E}_{x \sim p^*(x)}[F[x] \odot \overline{F[x]}](c, w, h) + 1) \quad (26)$$

where F is Discrete Fourier Transform, $\odot$ is the element-wise multiplication. It is then to set $$R(c, w, h) = \frac{1}{a}\left(\frac{R(c, w, h)}{\max R(c, w, h)} + \alpha - 1\right) \quad (27)$$

where $\alpha$ is the normalization parameter. This allows to adaptively scale the frequency coordinates according to the specific amplitudes. Empirically, 200 images randomly sampled from the dataset is enough for estimating this statistics, therefore this involves marginal extra computation. We observe that this approach works well for accelerating NCSN++, but has less effects on accelerating NCSN and NCSNv2. The possible reason is that these two models are not sophisticated enough as NCSN++ to utilize the delicate information from the frequency statistics. To address this issue, it is proposed the second approach which constructs the filter R simply using two parameters as follows $$R(c, h, w) = \begin{cases} 1, & \text{if}(h - 0.5H)^2 + (w - 0.5W)^2 \leq 2r^2 \\ \lambda, & \text{otherwise} \end{cases} \quad (28)$$

where C is the channel number, H is the height, and W is the width of an image. $1 \leq c \leq C$, $1 \leq h \leq H$ and $1 \leq w \leq W$. The parameter $\lambda > 0$ specifies the ratio for shrinking or amplifying the coordinates located out of the circle $\{(h-0.5H)^2 + (w-0.5W)^2 \leq 2r^2\}$, selected according to the failure behavior of the vanilla SGM. The radial range of the filter is controlled by r.

FIG. 1 illustratively shows examples of (Left) frequency preconditioning R $((r,\lambda))=(0.2H,0.9))$ and (Right) mean of FFHQ dataset used for constructing space preconditioning A used in proposed preconditioning operator M (Eq. (17)). This method works well on accelerating NCSN and NCSNv2.

For the computational complexity of PDS, the major overhead is from FFT and its inverse that only have the complexity of O(CHW(log H+log W)), which is neglectable compared to the whole diffusion complexity.

Experiments

In our experiments, the objective is to show how off-the-shelf SGMs can be accelerated significantly with the assistance of the proposed PDS whilst keeping the image synthesis quality, without model retraining.

For image synthesis, it is to use MNIST, CIFAR-10, LSUN (the tower, bedroom and church classes), and FFHQ datasets. Note, for all these datasets, the image height and width are identical, i.e., H=W.

For evaluating the model agnostic property of our PDS, we test three recent SGMs including NC SN, NCSNv2 and NCSN++.

We use the public released codebases of NCSN, NCSNv2 and NCSN++. For facilitating the comparisons, we follow the same preprocessing as that in NCSN, NCSNv2 and NCSN++. We conduct all the following experiments with PyTorch on NVIDIA RTX 3090 GPUs.

Figure 2:
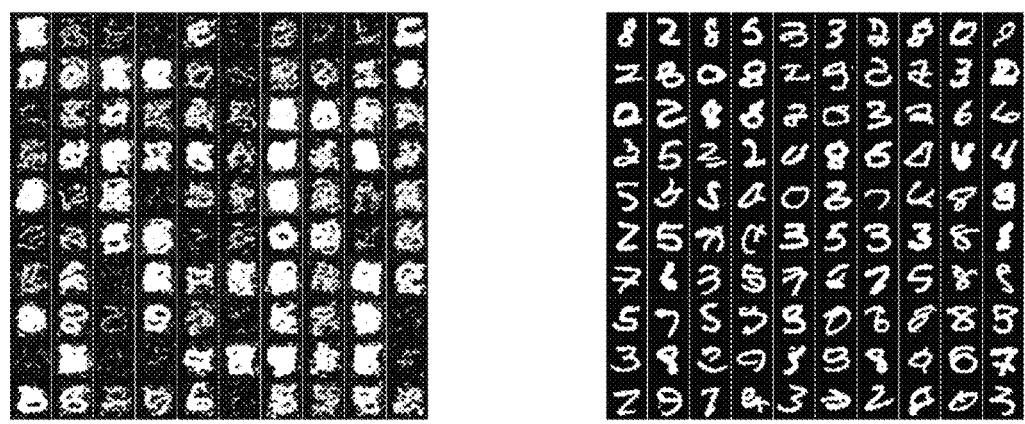
FIG. 2 illustratively shows images with the results of sampling using NCSN on MNIST (28×28) in one embodiment of this invention.

We use NCSN as the SGM for the simplest digital image generation (28×28). FIG. 2 illustratively shows the results of sampling using NCSN on MNIST (28×28), wherein the left part shows the results by the original sampling method with 20 sampling iterations, while the right part shows the results by our PDS with 20 sampling iterations. It can be seen that when reducing the sampling iterations from 1000 to 20 for acceleration, the original sampling method tends to generate images that lack the digital structure (see the left part of FIG. 2). This suggests us to enlarge a band of frequency part of the diffusion process. Therefore, we set $(r,\lambda)=(0.2H, 1.6)$. It is observed that our PDS can produce digital images with the fine digital structure well preserved under the acceleration rate.

Compared to DDPMs, SGMs have much worse performance when the number of sample iterations is relatively small. Our PDS can greatly alleviate this issue as shown in Table. 1, where we evaluate NCSN++ for generating CIFAR-10(32×32) by FID score.

TABLE 1

| T | NCSN++ | DDIM | Analytic-DDIM | NCSN++ W/PDS |
|---|--------|------|---------------|--------------|
| 100 | 29.39 | 6.08 | 3.55 | 3.26 |
| 200 | 4.35 | 4.02 | 3.39 | 2.61 |

As shown above, FID scores of vanilla NCSN++, NCSN++ with PDS, DDIM, and Analytic-DDIM under different iterations on CIFAR-10 are recorded in Table 1. We compare PDS with DDIM and the Analytic-DDIM, two representative DDPMs. It is observed that NCSN++ with PDS achieves the best FID scores under different acceleration cases. We apply filter R described by Eq. (26).

We then evaluate NCSNv2 to generate church images at a resolution of 96×96 and tower at a resolution of 128×128.

For both classes, when accelerated by reducing the iterations from original 3258 to 108 for tower and from original 3152 to 156 for church, we observe that the original sampling method tends to generate images without sufficient detailed appearance, similar as the situation on MNIST. Therefore, we also encourage the frequency part of the diffusion process that responsible for the details.

Figure 3:
FIG. 3 illustratively shows images with the results of sampling using NCSNv2 on LSUN according to one embodiment of this invention.

FIG. 3 illustratively shows the results of sampling using NCSNv2 on LSUN (church 96×96 and tower 128×128), wherein the left part shows results with the original sampling method with 156 iterations for church and 108 iterations for tower, while the right part shows the results with PDS sampling method with 156 iterations for church and 108 iterations for tower. It is evident that PDS can still generate rich fine details, even when the diffusion process is accelerated up to 20~30 times.

Figure 4:
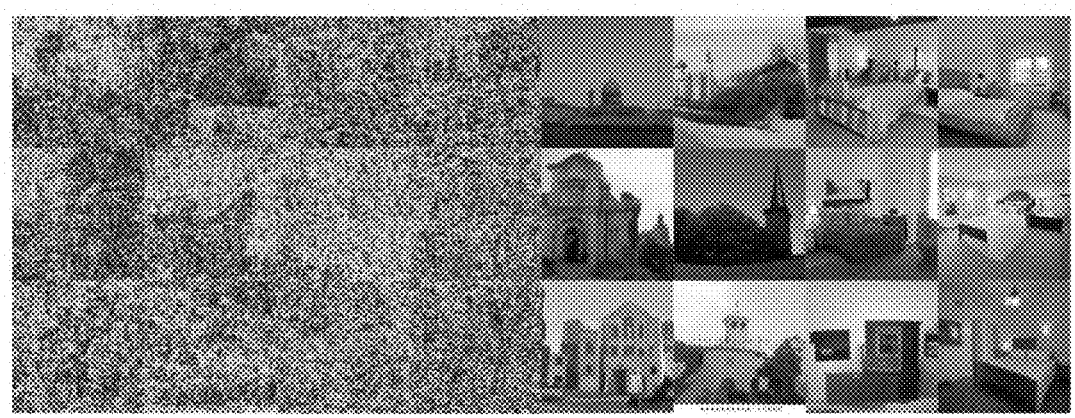
FIG. 4 illustratively shows the image results of sampling using NCSN++ on LSUN according to one embodiment of this invention.

Further, we evaluate NCSN++ to generate bedroom and church images at a resolution of 256×256. FIG. 4 illustratively shows the results of sampling using NCSN++ on LSUN (church and bedroom) (256×256), while the left part shows the results with the original sampling method with 166 sampling iterations, while the right part shows the result with our PDS sampling method with 166 sampling iterations. In this case, we instead observe that the original sampling method tends to generate images with overwhelming noises once accelerated (left of FIG. 4). We hence set filter R using Eq. (26) to regulate the frequency part of the diffusion process. As demonstrated in FIG. 4, our PDS is able to prevent the output images from being ruined by heavy noises. All these results suggest the ability of our PDS in regulating the different frequency components in the diffusion process of prior SGMs.

We use NCSN++ to generate high-resolution facial images at a resolution of 1024×1024. Similar as on LSUN, we also find out that when accelerated, the original sampling method is vulnerable with heavy noises and fails to produce recognizable human faces. For example, when reducing the iteration from original 2000 to 100, the output images are full of noises and unrecognizable. Similarly, we address this issue with our PDS with filter R. We also apply the space preconditioning to utilize the structural characteristics shared across the whole dataset.

Figure 5:
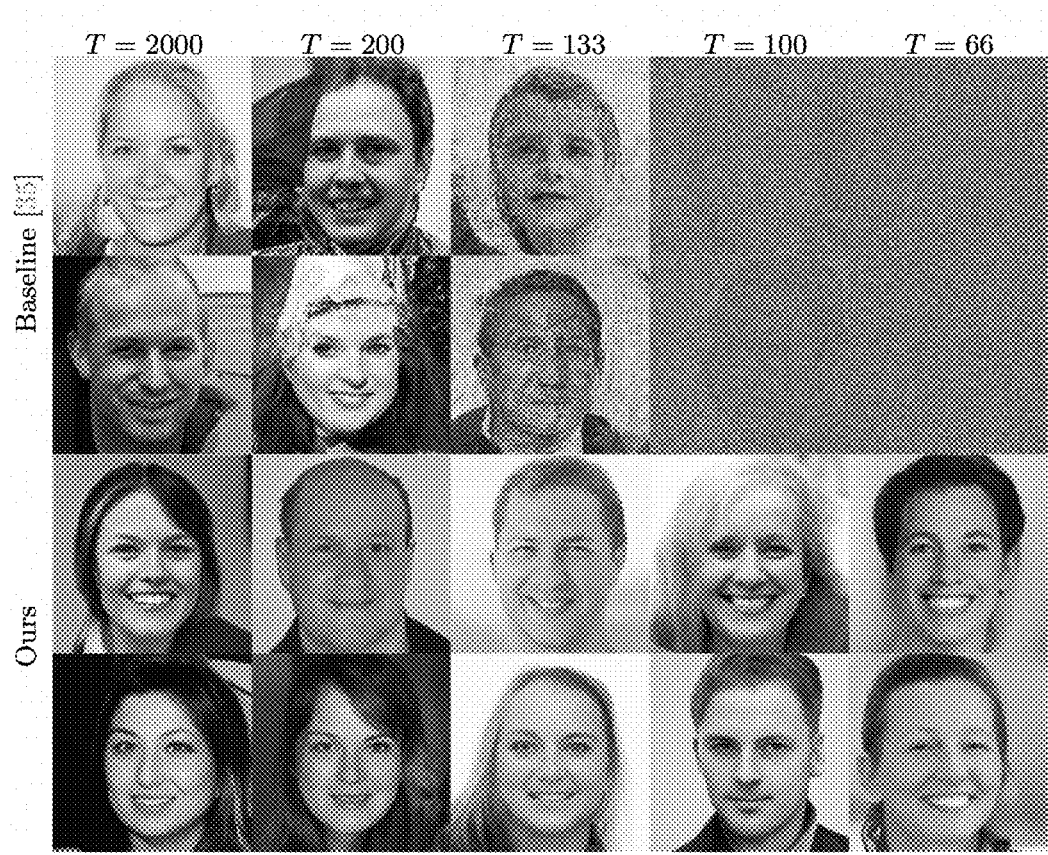
FIG. 5. illustratively shows facial images at a resolution of 1024×1024 generated by NCSN++ under a variety of sampling iterations without and (bottom) with the method according to one embodiment of this invention.

FIG. 5. illustratively shows facial images at a resolution of 1024×1024 generated by NCSN++ under a variety of sampling iterations (top) without and (bottom) with our PDS. It is evident that NCSN++ decades quickly with increasingly reduced sampling iterations, which can be well solved with PDS. In terms of running speed for generating a batch of 8 images, PDS reduces the time cost from 2030 seconds (the sampling iterations T=2000) to 71 seconds (T=66) on one NVIDIA RTX 3090 GPU, which delivers 29$^x$acceleration (Dataset: FFHQ). As shown in FIG. 5, PDS can maintain the image synthesis quality using only as less as 66 iterations, which is much less than 2000 iterations. In summary, all the above experiments indicate that our method is highly scalable and generalizable across different visual content, SGMs, and acceleration rates.

Apart from the quality evaluation on image synthesis as above, we further compare the running speed between the vanilla and our PDS using NCSN++. In this test, we use one NVIDIA RTX 3090 GPU. We track the average wall-clock time of generating a batch of 8 images. As shown in Table 2 (SGM: NCSN++. Time unit: Seconds), our PDS can significantly reduce the running time, particularly for high-resolution image generation on the FFHQ dataset.

TABLE 2

| Dataset | LSUN | FFHQ |
| --- | --- | --- |
| Vanilla | 1173 | 2030 |
| PDS | 90 | 71 |
| Speedup times | 13 | 29 |

Figure 6:
FIG. 6 illustratively shows the image results of parameter analysis according to one embodiment of this invention.

We investigate the effect of PDS's two parameters r and $\lambda$ in Eq. (28). We use NCSN++ with the sampling iterations T=166 on LSUN (bedroom). FIG. 6 illustratively shows the results of parameter analysis, wherein sampling is produced by PDS using NCSN++ on LSUN (bedroom) (256×256) with 166 sampling iterations, and parameters (r, $\lambda$) is set to a variety of combination. It is observed in FIG. 6 that there exists a large good performing range for each parameter. If $\lambda$ is too high or r is too low, PDS will degrade to the vanilla sampling method, yielding corrupted images; instead, if $\lambda$ is too low or r is too high, which means over-suppressing high-frequency signals in this case, pale images with fewer shape details will be generated. For NCSN++, since we directly use the statistics information to construct R, there is no need to worry about selecting r and $\lambda$.

In this section, we study the effect of the solenoidal term $S\nabla x \log p^*(x)$ to the diffusion process. As long as S is skew-symmetric, it will not change the steady-state distribution of the original process. To verify this claim experimentally, we further generalize the original process as $$dx = \frac{\epsilon^2}{2}(M^{-1}M^{-T} + \omega S)\nabla_x \log p^*(x)dt + \varepsilon M^{-1}dw \tag{29}$$

where $\omega$ is the parameter that controls the scale of S.

Figure 7:
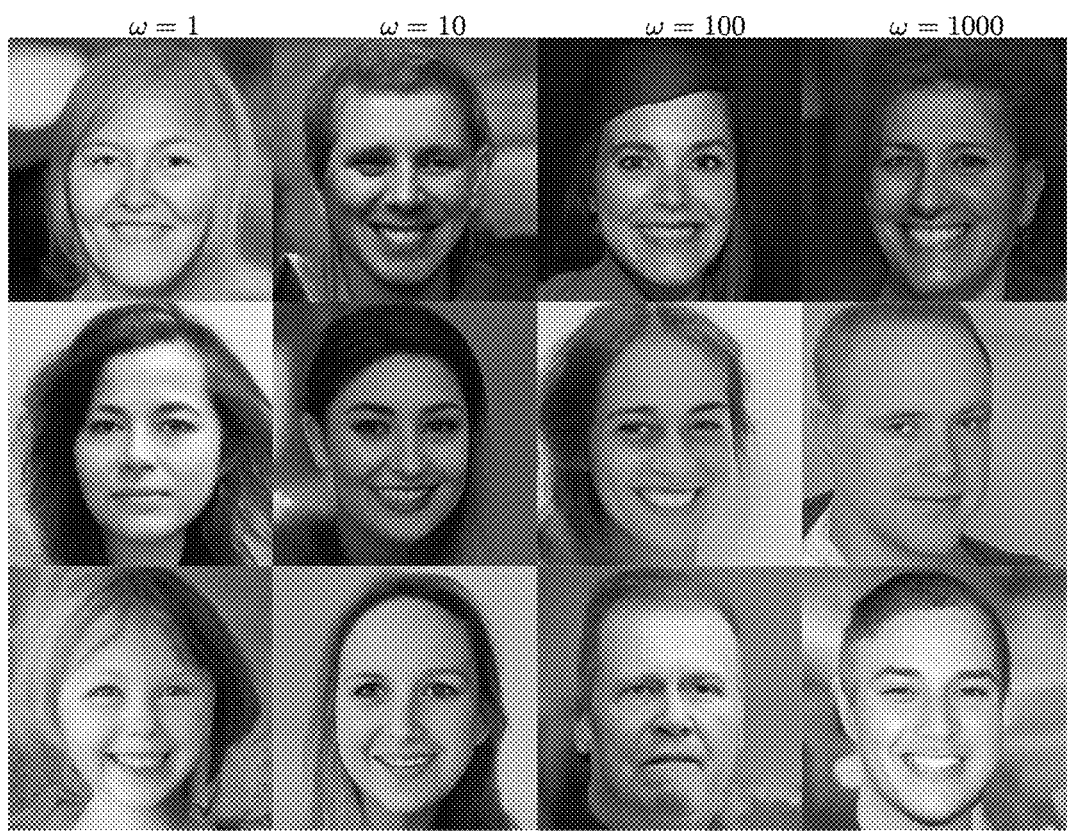
FIG. 7 illustratively shows the image samples produced by PDS using NCSN++ on FFHQ with different solenoidal terms according to one embodiment of this invention.

FIG. 7 illustratively shows the samples produced by PDS using NCSN++ on FFHQ (1024×1024) with different solenoidal terms (controlled by $\omega$). The sampling iteration is set to 66. It is to set $S[\cdot]=\text{Re}[F[\cdot]-F^T[\cdot]]$ which is obviously skew-symmetric. We change the scale of $\omega$ from 1 to 1000 for evaluating its impact on the output samples. It is observed that $\omega$ does not affect the quality of output images. This verifies that S does not change the steady-state distribution of the original diffusion process. Additionally, we perform similar tests with different iterations and other different skew-symmetric operator S. We still observe no obvious acceleration effect from the solenoidal term.

Briefly, in this application, we have proposed a novel preconditioned diffusion sampling (PDS) method for accelerating off-the-shelf score-based generative models (SGMs), without model retraining. Considering the diffusion process as a Metropolis adjusted Langevin algorithm, we reveal that existing sampling suffers from ill-conditioned curvature. To solve this, we reformulate the diffusion process with matrix preconditioning whilst preserving its steady-state distribution (i.e., the target distribution), leading to our PDS solution. Experimentally, we show that PDS can significantly accelerate existing state-of-the-art SGMs while maintaining the generation quality.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A method for accelerating score-based generative models (SGM), comprising:
   setting a frequency mask (R) and a space mask (A) for a given dataset, wherein the frequency mask (R) and the space mask (A) both have a same shape as a data point in the dataset;
   setting a target sampling iteration number (T);
   sampling an initial sample ($x_0$) which is a random Gaussian vector, having the same shape as a data point in the dataset;
   conducting iteration, for each iteration number (t) from 1 to the target sampling iteration number (T), conducting steps comprising:
      sampling a noise term which has a same shape as an initial sample;
      applying a preconditioned diffusion sampling (PDS) operator (M) to the noise term to generate a preconditioned noise term, wherein the PDS operator is constructed as follows:
         (a) using Fast Fourier Transform (FFT) to generate a first mapped vector by mapping an input vector in a space domain into the frequency domain;
         (b) adjusting the first mapped vector using the frequency mask (R), wherein the frequency mask (R) regulates the frequency coordinates of the input vector and is in element-wise multiplication with the first mapped vector;
         (c) mapping the adjusted first mapped vector back to the space domain by the inverse of Fast Fourier Transform to generate a second mapped vector; and
         (d) using the space mask (A) to regulate the pixel coordinates of the input vector, wherein the space mask is in element-wise multiplication with the second mapped vector;
      wherein the elements of the frequency mask (R) are all positive;
      calculating a drift term by an update function which has input parameters including the sample of the previous iteration ($x_{t-1}$), the present iteration number, and the present step size;
      applying the transpose of the PDS operator ($M^T$) and then applying the PDS operator (M) to the drift term, to generate a preconditioned drift term; and
      calculating the summation of the preconditioned drift term and a scale term, and then taking a real part of the summation for the diffusion of the sample of present iteration ($x_t$); wherein the scale term controls the scale of the noise term; and
   outputting the sample of the final iteration ($x_T$), which obeys the distribution of the dataset.

2. The method of claim 1, wherein after the step of applying the transpose of the PDS operator ($M^T$), the steps in the iteration further comprise calculating a solendial term of the present iteration ($S_t$) constructed by a score function transformed by a skew-symmetric linear operator, wherein the score function is fitted by the SGM network, and adding the solendial term into the summation in the step of calculating the summation of the preconditioned drift term and a scale term.

3. The method of claim 1, wherein the dataset comprises audio, image and/or video data.

4. The method of claim 1, wherein using FFT to generate a first mapped vector comprises adopting 2D FFT when the input vector is an image.

5. The method of claim 4, wherein adopting 2D FFT comprises implementing 1D FFT column-wise and row-wise successively.

6. The method of claim 1, wherein the frequency mask is calculated by utilizing statistics of the dataset.

7. The method of claim 1, wherein the frequency mask is constructed by the formula $$R(c, h, w) = \begin{cases} 1, & \text{if}(h - 0.5H)^2 + (w - 0.5W)^2 \leq 2r^2 \\ \lambda, & \text{otherwise} \end{cases}$$

where $1 \leq c \leq C, 1 \leq h \leq H$ and $1 \leq w \leq W$, while C is a channel number, H is a height, and W is a width of the image; and
wherein the parameter $\lambda > 0$ specifies a ratio for shrinking or amplifying coordinates located out of the circle $\{(h-0.5H)^2 + (w-0.5W)^2 \leq 2r^2\}$, and r is a radial range of a filter.

8. A method for constructing a preconditioning operator to accelerate a sampling phase of a score-based generative model (SGM), comprising:
   (a) generating a first mapped vector by using Fast Fourier Transform (FFT) to map an input vector in a space domain into the frequency domain;
   (b) adjusting the first mapped vector by using a frequency mask (R) having a same shape as the input vector, to regulate the frequency coordinates of the input vector, wherein the frequency mask (R) is in element-wise multiplication with the first mapped vector;
   (c) generating a second mapped vector by mapping the adjusted first mapped vector back to the space domain by the inverse of Fast Fourier Transform; and
   (d) using a space mask (A) having the same shape as the input vector to regulate the pixel coordinates of the input vector, wherein the space mask is in element-wise multiplication with the second mapped vector;
   wherein the elements of the frequency mask (R) are all positive.

9. The method of claim 8, wherein generating a first mapped vector by using FFT includes adopting 2D FFT when the input vector is an image.

10. The method of claim 9, wherein adopting 2D FFT comprises implementing 1D FFT column-wise and row-wise successively.

11. The method of claim 8, wherein the frequency mask is calculated by utilizing statistics of the dataset.

12. The method of claim 8, wherein the frequency mask is constructed by the formula $$R(c, h, w) = \begin{cases} 1, & \text{if}(h - 0.5H)^2 + (w - 0.5W)^2 \leq 2r^2 \\ \lambda, & \text{otherwise} \end{cases}$$

where $1 \leq c \leq C, 1 \leq h \leq H$ and $1 \leq w \leq W$, while C is the channel number, H is the height, and W is the width of the image; and
wherein the parameter $\lambda > 0$ specifies a ratio for shrinking or amplifying coordinates located out of the circle $\{(h-0.5H)^2(w-0.5W)^2 \leq 2r^2\}$, and r is a radial range of the filter.

13. A system for accelerating score-based generative models (SGM), including a processor, which is adapted for running a computer program to implement computer instructions as follows:

setting a frequency mask (R) and a space mask (A) for a given dataset, wherein the frequency mask (R) and the space mask (A) both have a same shape as a data point in the dataset;

setting a target sampling iteration number (T);

sampling an initial sample ($x_0$) which is a random Gaussian vector, having the same shape as a data point in the dataset;

conducting iteration, for each iteration number (t) from 1 to the target sampling iteration number (T), conducting steps comprising:

sampling a noise term which has a same shape as an initial sample;

applying a preconditioned diffusion sampling (PDS) operator (M) to the noise term to generate a preconditioned noise term, wherein the PDS operator is constructed as follows:

(a) using Fast Fourier Transform (FFT) to generate a first mapped vector by mapping an input vector in a space domain into the frequency domain;

(b) adjusting the first mapped vector using the frequency mask (R), wherein the frequency mask (R) regulates the frequency coordinates of the input vector and is in element-wise multiplication with the first mapped vector;

(c) mapping the adjusted first mapped vector back to the space domain by the inverse of Fast Fourier Transform to generate a second mapped vector; and (d) using the space mask (A) to regulate the pixel coordinates of the input vector, wherein the space mask is in element-wise multiplication with the second mapped vector;

wherein the elements of the frequency mask (R) are all positive;

calculating a drift term by an update function which has input parameters including the sample of the previous iteration ($x_{t-1}$), the present iteration number, and the present step size;

applying the transpose of the PDS operator ($M^T$) and then applying the PDS operator (M) to the drift term, to generate a preconditioned drift term; and calculating the summation of the preconditioned drift term and a scale term, and then taking a real part of the summation for the diffusion of the sample of present iteration ($x_t$); wherein the scale term controls the scale of the noise term; and outputting the sample of the final iteration ($x_T$), which obeys the distribution of the dataset.

14. The system of claim 13, wherein after the step of applying the transpose of the PDS operator ($M^T$), the steps in the iteration further comprise calculating a solendial term of the present iteration ($S_t$) constructed by a score function transformed by a skew-symmetric linear operator, wherein the score function is fitted by the SGM network, and adding the solendial term into the summation in the step of calculating the summation of the preconditioned drift term and a scale term.

15. The system of claim 14, wherein the dataset comprises audio, image and/or video data.

16. The system of claim 13, wherein using FFT to generate a first mapped vector comprises adopting 2D FFT when the input vector is an image.

17. The system of claim 13, wherein adopting 2D FFT comprises implementing 1D FFT column-wise and row-wise successively.

18. The system of claim 13, wherein the frequency mask is calculated by utilizing statistics of the dataset.

19. The system of claim 13, wherein the frequency mask is constructed by the formula $$R(c, h, w) = \begin{cases} 1, & \text{if}(h - 0.5H)^2 + (w - 0.5W)^2 \leq 2r^2 \\ \lambda, & \text{otherwise} \end{cases}$$

where $1 \leq c \leq C, 1 \leq h < H$ and $1 \leq w \leq W$, while C is a channel number, H is a height, and W is a width of the image; and wherein the parameter $\lambda > 0$ specifies a ratio for shrinking or amplifying coordinates located out of the circle $\{(h-0.5H)^2+(w-0.5W)^2 \leq 2r^2\}$, and r is a radial range of a filter.

* * * * *